INVENTOR.
JOHN R. SUDYK

McNENNY, FARRINGTON, PEARNE & GORDON

ATTORNEYS

June 3, 1969  J. R. SUDYK  3,447,794
RUBBER COVERED CHAIN FENDER

Filed May 13, 1966  Sheet 2 of 2

INVENTOR.
JOHN R. SUDYK

McNENNY, FARRINGTON, PEARNE & GORDON
ATTORNEYS

United States Patent Office 3,447,794
Patented June 3, 1969

3,447,794
RUBBER COVERED CHAIN FENDER
John R. Sudyk, Huntsburg, Ohio, assignor to The Johnson Rubber Co., Middlefield, Ohio, a corporation of Ohio
Filed May 13, 1966, Ser. No. 549,976
Int. Cl. F16f 13/00; B63b 43/18
U.S. Cl. 267—1  4 Claims

ABSTRACT OF THE DISCLOSURE

A fender comprising an elongated body of rubber material having a substantially uniform square cross section. A link chain is embedded therein and extends lengthwise therethrough, with free ends of the chain at the ends of the body so that the fender can be connected to a supporting structure. The links of the chain within the rubber are in an extended position, and the rubber surrounds each link so that relative movement between the links and the rubber does not occur and wear of the rubber body is minimized.

---

This invention relates to a novel and improved fender device and to a method and apparatus for forming such fender devices.

Flexible fender devices find considerable use where large loads are encountered. For example, fender devices incorporating the present invention are suitable for use on ships, land vehicles, loading docks, piers, in cargo slings, and any other place where durability and cushioning are required. The illustrated structure includes a solid, resilient body, preferably formed of tough rubber or rubber-like material, with a link chain embedded therein and extending lengthwise therethrough. The chain is provided with free end portions at the ends of the body so that the fender can be connected to a supporting structure.

One use for this improved fender device is on the bows of tugs used to push barges and the like. Usually the fender is positioned around the bow and secured in place with turnbuckles connected to the ends of the chain. In such use the fender is positioned between the tug and the barge and absorbs the entire thrust of the tug while cushioning both the tug and barge to prevent damage. Because there is relative movement between the tug and barge while the fender is under load, there is a strong tendency for the resilient material to work back and forth relative to the anchoring chain.

In the past it has been customary to use fenders formed of tubular rubber bodies with a chain extending therethrough: In such former fenders the chain is not embedded in the body material and the body works back and forth relative to the chain. This causes the chain to cut and abrade the rubber of the body and results in rapid deterioration of the fender requiring frequent fender replacement. The failure caused by the chain abrasion of the rubber generally occurs before excessive exterior surface wear because the bow of the tug and the engaged portion of the barge are usually smooth and do not result in excessive abrasion of the exterior surface of the fender.

With an improved fender incorporating this invention the flexible material completely embeds each link of the chain and extends through the links. Therefore, the chain links are individually anchored against movement relative to the flexible body and abrasion of the body material by the chain is completely eliminated. Consequently, the fender has an improved service life.

Fenders incorporating this invention are also particularly useful in installation where the fenders must be large. For example, when the present type of fender is used on the supporting "cans" of an off-shore drilling rig each fender may weigh in the order of one thousand pounds. These fenders are hung vertically on their chains from their upper ends and the interlocking between the chain links and the rubber distributes the weight of the rubber along the entire length of the embedded chain. If such fenders were not formed with embedded chain the entire weight of the rubber would rest on the chain at the lower end and would cause the chain to cut and tear the lower end of the rubber section.

This invention also provides a novel and improved method and apparatus for forming a fender-like structure wherein the resilient material is extruded through an extrusion orifice around a chain in such a manner that an inward flow of the extruding material occurs as it approaches the extrusion orifice causing the material to completely fill the voids and spaces within the links of the chain.

It is an important object of this invention to provide a novel and improved fender having an elongated resilient body of uniform cross section with a link chain extending therethrough wherein the resilient material of the body extends into the links of the chain to lock the chain against movement relative to the adjacent material and wherein a free portion of chain extends beyond at least one end of the body.

It is another important object to provide a novel and improved fender according to the last preceding object wherein the links extending through the body are in their extended position so that tension applied to the ends of the chain does not appreciably change the length of the portion of the chain within the body.

It is another important object of this invention to provide a novel and improved method for extruding an elongated article having a uniform cross section consisting of an extrudable material with a link chain extending therethrough wherein the extrudable material fills the openings in the links completely embedding such links.

It is another important object of this invention to provide a novel and improved extrusion die for performing the method of the lasting preceding object.

Further objects and advantages of this invention will be apparent from the following description and drawings, wherein.

Figure 1:
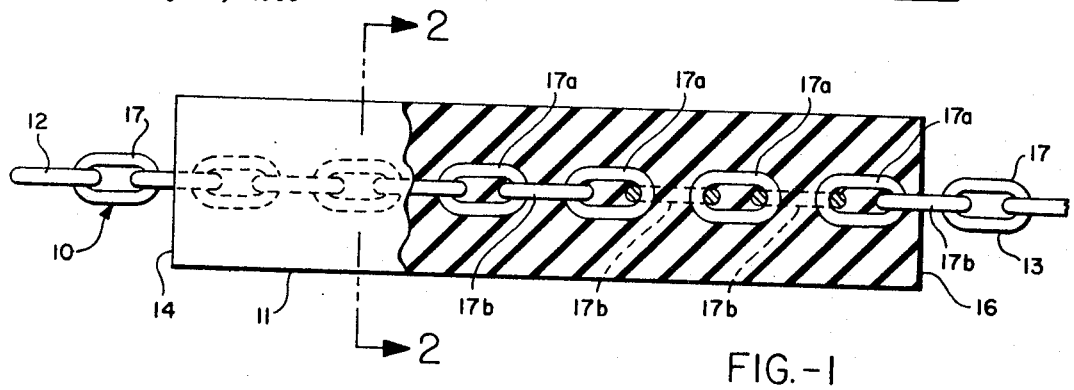
FIGURE 1 is a side elevation partially in longitudinal section of a preferred form of fender incorporating the present invention.
Figure 2:
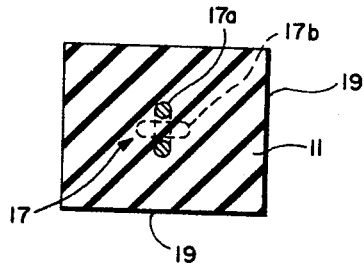
FIGURE 2 is a cross section of the fender illustrated in FIGURE 1 taken along 2—2 of FIGURE 1.

Referring to the drawings, the illustrated fender consists of two parts, a link chain 10 and a rubber body 11. The body 11 may be formed with substantially any desired cross section. The illustrated fender is rectangular in section. The link chain 10 extends through the body along its central axis and is provided with free end portions 12 and 13 extending beyond the end faces 14 and 16, respectively, of the body 11. The body 11 is solid and is formed of an abrasive resistant, tough, rubber or rubber-like material providing resiliency to absorb substantial impacts without appreciable surface damage.

The chain 10 consists of a plurality of similar links 17 which in the illustrated embodiment are formed as closed loops having a length exceeding their width. The links 17 within the body 11 are oriented with respect to each other so that their length is aligned with the central axis of the body and the chain within the body is therefore in an extended condition, as best illustrated by the links 17a and 17b which appear in the cutaway section of FIGURE 1. The links 17a and 17b are normally identical with alternate links contained substantially within a plane perpendicular to the adjacent links on either side. The illustrated links 17 form substantially planar loops, however, the type of chain having twisted links may also be used.

The rubber material of the body 11 extends into the openings within each of the links completely embedding each link and preventing any substantial movement of the individual links relative to the adjacent surfaces of the rubber material. When the chain 10 is loaded in tension there is no relative movement between the links within the body 11 other than the slight deflections of the links themselves created by such loading conditions. Since the body material is flexible if deflects with the chain under this condition and there is no relative movement between the links and adjacent body material.

In order to insure that the impact capacity of the fender is not adversely affected by the chain extending therethrough it is preferable to form the cross section of the fender so that the thickness of rubber between each of the sides and the closest portion of the chain is at least equal to the lateral width of the chain links 17. This insures that a substantial mass of rubber is available between the sides 19 and the chain links to properly absorb impact energy without inducing damaging loads on the rubber material adjacent to the chain links.

Figure 3:
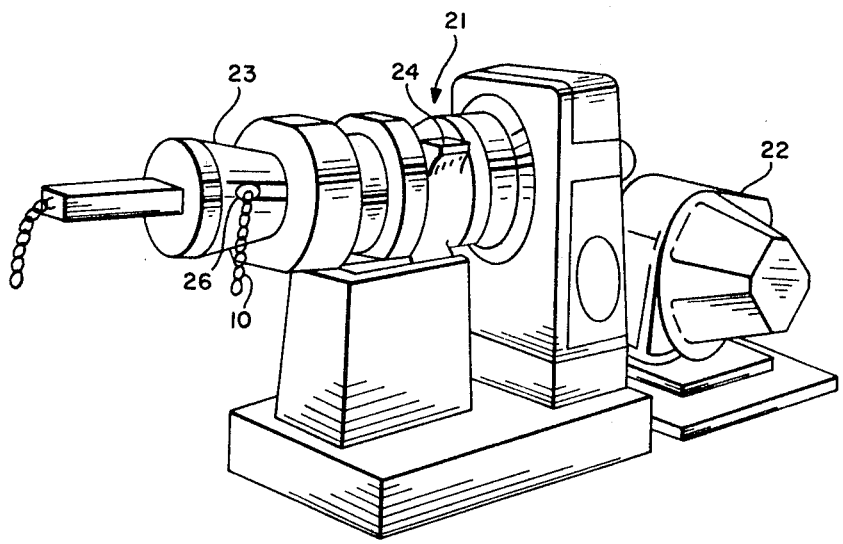
FIGURE 3 is a perspective view of an extrusion machine suitable for use in making the fender illustrated in FIGURE 1 according to a method incorporating the present invention.

Referring now to FIGURE 3, one suitable machine for performing a method incorporating this invention is a typical extruding machine 21 driven by a motor 22 and having the worm type feed to pressurize the extrudable material in an extrusion die 23. The extrudable material is fed into the machine at 24 and the chain 10 enters the die 23 at 26. An extrusion die is provided with an extrusion orifice 27 through which the chain 10 and body 11 pass. The rubber supplied to the machine and extruded through the orifice 27 is uncured and is subsequently cured to complete the manufacture of the fender.

Figure 4:
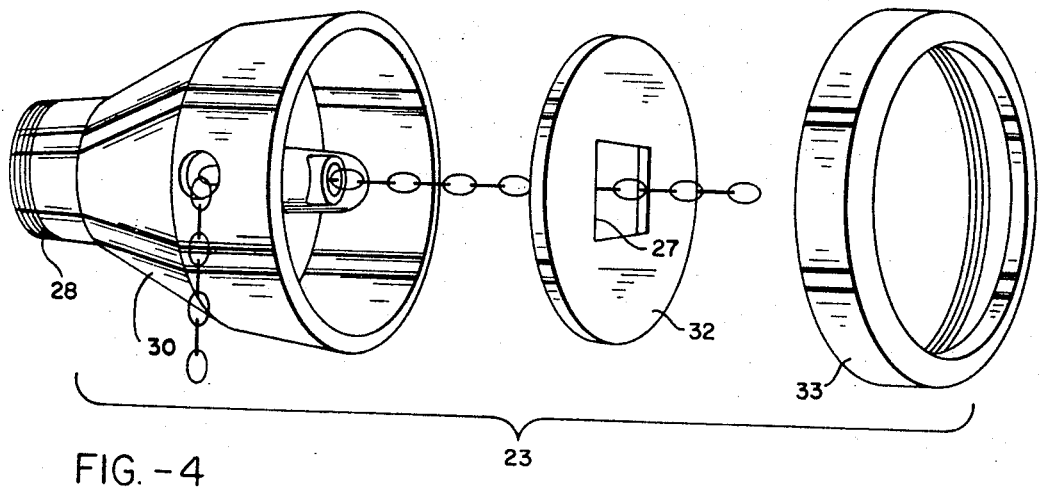
FIGURE 4 is an enlarged exploded view of the extrusion die illustrating the structural arrangement thereof.
Figure 5:
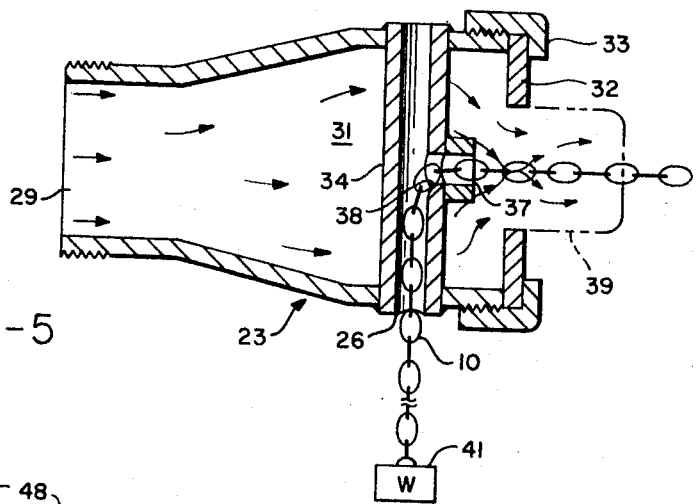
FIGURE 5 is a cross section of the extrusion die illustrating the flow direction and operation thereof; and, FIGURE 6 is a schematic illustration of the preferred method of removing a portion of extruded material from the chain to provide a free end portion thereof.

Referring now to FIGURES 4 and 5, the extrusion die 23 includes a tubular body 30 threaded at its inlet end 28 for mounting on the machine. The uncured rubber enters the die through an inlet 29 and passes into a die chamber 31. The orifice 27 is formed in an orifice plate 32 mounted at the forward end of the body 30 by a threaded cap 33. Located within the chamber 31 at a point spaced back from the orifice plate 32 is a tube 34 open through the wall of the body at 26 and sized to admit the chain 10. The tube 34 extends across the chamber 31 and is provided with a centrally located, lateral, tubular opening 37 aligned with the center of the orifice 27 but spaced back therefrom. The corner at 38 is rounded to facilitate chain movement.

The chamber 31 is completely filled with the uncured rubber material and is pressurized by the extruding machine so that it flows from the inlet 29 along the chamber 31 past the tube 34 and opening 37 to the orifice 27. The cross sectional area of the chamber 31 around the tube 34 is larger than the cross sectional area of the orifice 27 so that the pressure on the material produces radially inward flow of the uncured material as it passes the opening 37 of the tube 34. This radially inward flow causes the uncured rubber to flow into the chain completely surrounding the links thereof so that the material emerging from the orifice as indicated by the phantom lines 39 completely fills the chain and assumes the shape of the orifice 27.

Because the extruding material goes into and embeds each link of the chain, the chain is automatically carried along with the material as it passes through the orifice 27 so no separate feeding is required. In order to insure that the links of the chain are extended as they pass out of the tube 34 tension is applied to the chain 10 as it approaches the opening 26. This is schematically illustrated by the weight 41.

It is important to arrange the opening 37 back from the orifice 27 so that the opening will be in a zone of radial pressure and the extruding material will flow into the chain. It is also important to arrange the cross sectional area of the chamber 31 in the zone of the tube 34 and around the tube 34 so that it is greater than the area of the orifice 27. This insures that the extruding material is under pressure created by the reduction in areas approaching the orifice which pressure produces the radial flow to fill the chain links.

The extruding rubber material flows around the opening 37 and into the links of the chain 10. Since the openings in the links are filled from opposite sides, the flowing material meets or abuts along a plane substantially in the central plane of each link opening. Maximum anchoring of the links occurs when the pressure on the rubber is sufficient to create a full bond in this abutting plane. The pressure required to produce this bond varies with the material being extruded. However, the required pressure can be obtained and maintained without difficulty.

With a given die the pressure at a given location within the die depends on the rate of extrusion and the viscosity of the extruding material. The pressure of the flowing material is substantially equal to atmospheric pressure at the plane of the orifice and the pressure is progressively higher at points spaced back from the orifice plane. The proportions of the die and the extrusion rate are chosen so that sufficient pressure exists adjacent to the opening 37 to fill the chain and produce the desired bond within the opening of each link.

The proportions and extrusion rate should be arranged so that excessive pressures do not occur adjacent to the opening 37, since such excessive pressures would tend to cause flow into the opening 37. Because the flow of material through the chamber 31 is toward the orifice and the opening 37 faces downstream to this flow, there is little tendency for the extruding material to flow into the opening 37 unless the pressure is excessive. Also, the movement of the chain along the tube and out through the opening 37 tends to prevent entry of extruding material into the tube.

One extrusion die which has functioned satisfactorily when extruding uncured rubber has an orifice opening four and one-half inches by six and one-eighth inch. The tube 34 has a diameter of three and one-half inches with a one eighth inch wall. The opening 37 is spaced back from the rearward face of the orifice place 32 by a distance of four and five-sixteenths inches.

Figure 6:
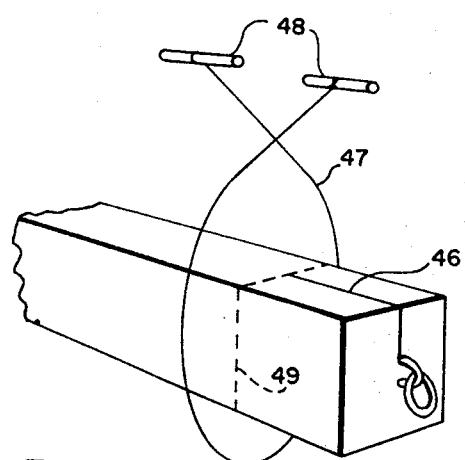

With the present invention fenders of substantially any length can be made, since the extrusion illustrated is a continuous extrusion process. Usually the extrusion is performed continuously. The extruded material is then cut to the desired length. The free end portions 12 and 13 may then be obtained by cutting away uncured material according to a method schematically illustrated in FIGURE 6. First the uncured rubber is cut along a line 46. The uncured rubber is then cut laterally by a wire 47 having suitable handles 48. The wire is looped around the body at the proper position and pulled so that the wire cuts inwardly through the body until the wire reaches the chain. In this way a cut is made completely around the chain at the proper axial location. This cut is illustrated by the dotted line 49. The uncured rubber between the dotted line 49 and the end is then easily peeled away leaving the chain substantially free. The cut away rubber is then fed back through the machine 21 and is reextruded so there is no waste.

The uncured fender is then cured, usually by heat to complete its manufacture.

Although a preferred embodiment of this invention is illustrated, it is to be understood that various modifications and rearrangements of parts may be resorted to without departing from the scope of the invention.

What is claimed is:

1. A fender comprising an elongated body of resilient material having a substantially uniform cross section throughout the length thereof, and a link chain extending axially through said body and beyond at least one end thereof, said chain within said body being positioned in its extended position so that tension applied to the end of said chain does not materially increase the length of said chain within said body, said material extending through and around said links within said body preventing substantial movement of such links relative to the adjacent material and preventing wear of said adjacent material, said body having a cross section so that the shortest distance between its lateral exterior surface and the closest portion of said chain is at least equal to the lateral width of the links of said chain, said material providing means cushioning lateral compressive forces so that lateral compressive forces of a value normally encountered are cushioned and absorbed to a sufficient degree to prevent such forces from causing ruptures in said material adjacent to said chain.

2. A fender as set forth in claim 1 wherein the cross section of said body is substantially rectangular.

3. A fender as set forth in claim 2 wherein the cross section of said body is square and has a lateral width greater than three times the lateral width of the links of said chain within said body, and said body being substantially symmetrical with respect to the axis of said chain.

4. A fender as set forth in claim 3 wherein material of said body is solid rubber.

References Cited

UNITED STATES PATENTS

| | | | |
|---|---|---|---|
| 903,503 | 4/1910 | Pendleton | 57—149 |
| 1,605,102 | 11/1926 | Dryden | 114—219 |
| 1,815,413 | 7/1931 | Lockwood | 114—219 |
| 2,062,919 | 12/1936 | Maas | 114—219 |
| 2,110,226 | 3/1938 | Hill | 59—78 |
| 2,197,839 | 4/1940 | Roberts et al. | 114—219 |
| 2,960,365 | 11/1960 | Meisen | 294—74 |
| 3,002,409 | 10/1961 | Jones | 81—177 |
| 981,260 | 1/1911 | Harris | 293—71 |
| 1,180,418 | 4/1916 | Olson | 293—72 |
| 1,577,684 | 3/1926 | Bond | 152—22 |
| 1,649,166 | 11/1927 | Kahil | 293—71 |
| 2,986,419 | 5/1961 | Barenyi | 293—71 |

ARTHUR L. LA POINT, *Primary Examiner.*

HOWARD BELTRAN, *Assistant Examiner.*

U.S. Cl. X.R.

18—13; 61—48, 52; 114—219; 152—221; 293—71, 72; 294—74, 82